(12) United States Patent
Marten

(10) Patent No.: US 6,511,764 B1
(45) Date of Patent: Jan. 28, 2003

(54) VOLTAIC PILE WITH CHARGE EQUALIZING SYSTEM

(75) Inventor: Victor Marten, Flushing, NY (US)

(73) Assignee: Usar Systems, Inc., New York, NY (US)

( * ) Notice: Subject to any disclaimer, the term of this patent is extended or adjusted under 35 U.S.C. 154(b) by 0 days.

(21) Appl. No.: 09/445,125

(22) PCT Filed: Oct. 20, 1998

(86) PCT No.: PCT/US98/22132

§ 371 (c)(1),
(2), (4) Date: Mar. 15, 2000

(87) PCT Pub. No.: WO99/21241

PCT Pub. Date: Apr. 29, 1999

Related U.S. Application Data

(60) Provisional application No. 60/063,178, filed on Oct. 20, 1997.

(51) Int. Cl.⁷ ............................................. H01M 10/00
(52) U.S. Cl. .............................. 429/7; 429/50; 320/119; 320/125
(58) Field of Search ....................... 429/7, 50; 320/108, 320/119, 125

(56) References Cited

U.S. PATENT DOCUMENTS

| | | | | |
|---|---|---|---|---|
| 4,296,461 A | * | 10/1981 | Mallory et al. ............. | 429/7 X |
| 5,146,149 A | * | 9/1992 | Nilssen ...................... | 429/7 X |
| 5,412,305 A | * | 5/1995 | Jeanneret .................... | 320/119 |
| 5,550,452 A | * | 8/1996 | Shirai et al. ................ | 320/108 |
| 5,703,464 A | * | 12/1997 | Karunasiri et al. ......... | 320/125 |
| 5,767,660 A | * | 6/1998 | Schmidt ................. | 320/119 X |

* cited by examiner

Primary Examiner—Stephen Kalafut
(74) Attorney, Agent, or Firm—Oppedahl & Larson LLP

(57) ABSTRACT

A voltaic pile has first and second terminals by which it is charged and discharged. The pile comprises a plurality of modules (3), each having respective third and fourth terminals with a plurality of voltaic cells connected in series therebetween. The modules are connected series-wise or in series-parallel configuration by the respective third and fourth terminals, with the end terminals of the series of modules defining the previously mentioned first and second terminals. A power supply Load (1) is provided with DC input terminals and AC output terminals, the DC input terminals connected via lines (2) with the first and second terminals. Thus, even in the absence of Power charging current or drain current, the power supply is able to draw upon the output of the pile to supply power back to individual modules that may require charging, to maintain balance among the modules. Each of the modules has respective charging terminals connected with the power supply AC output terminals, and also has a transformer with a primary winding connected to the charging terminals and a secondary winding coupled via a rectifier with the cells of the modules, whereby the cells are charged.

18 Claims, 2 Drawing Sheets

VOLTAIC PILE WITH CHARGE EQUALIZING SYSTEM

This patent application claims priority from U.S. provisional application No. 60/063,178 filed Oct. 20, 1997, which application is hereby incorporated herein by reference in any country that permits incorporation by reference.

The invention relates generally to voltaic piles and relates more particularly to voltaic piles which are charged and discharged through two terminals and which contain a charge redistribution system for equalizing charge among cells thereof, which charge redistribution system operates at a much lower power level than the full charging or discharging power level of the system.

BACKGROUND

Much attention has been given in recent years to the efficiency and reliability of rechargeable batteries (voltaic piles). It is desired to have the benefit of a large number of charge/discharge cycles, thus saving the inconvenience, downtime and expense of replacement of the battery and the environmental costs of disposal. But even with the most stringent manufacturing controls it is impossible to manufacture the cells of the pile so that each one has exactly the same capacity as the next, throughout the useful life of the cell. It invariably happens that one cell ages differently than its neighbors. The performance of the pile is essentially limited to the performance of the weakest cell in the pile. When that weakest cells is discharged, the pile becomes unusable.

It is, of course, well-known to perform the recharging of individual cells in a series configuration by means of isolation transformers, with a secondary winding for each cell, shown for example in U.S. Pat. No. 5,412,305 to Jeanneret (issued May 2, 1995). But such an approach does not necessarily take full advantage of the recharging opportunity provided by, for example, regenerative braking in an electric vehicle. And such an approach does not necessarily permit balancing of cell charge in real time during quiescent intervals. In particular it may be bulky and inefficient if used for overall charging of the pile and if also used for low-power charge redistribution.

It is thus desirable to provide a system in which energy is removed from the entire voltaic pile and is used to replace energy into individual cells or groups of cells having the smallest capacity, at a low power level relative to the charge and discharge power levels. It is also desirable to provide a system which takes full advantage of regenerative braking in an electric vehicle.

SUMMARY OF THE INVENTION

A voltaic pile has first and second terminals by which it is charged and discharged. The pile comprises a plurality of modules, each having third and fourth respective terminals with a plurality of voltaic cells connected series-wise therebetween. The modules are connected series-wise (or in series-parallel configuration) by the respective third and fourth terminals, with end terminals of the series-wise-connected modules defining the previously mentioned first and second terminals. A power supply is provided with DC input terminals and AC output terminals, the DC input terminals connected with the first and second terminals. Thus, even in the absence of charging current or drain current, the power supply is able to draw upon the output of the pile to supply power back to individual modules that may require charging to maintain balance among the modules. Each of the modules has respective charging terminals connected with the power supply AC output terminals, and further has a transformer with a primary winding connected with the charging terminals and a secondary winding coupled via a rectifier with the cells of the modules, whereby the cells are charged. Importantly, the charge redistribution power level is small compared with the main drain and charge power levels.

DESCRIPTION OF THE DRAWING

The invention will be described with respect to a drawing in several figures, of which.

DETAILED DESCRIPTION

There are, generally speaking, three approaches for construction of a multi-cell pack or voltaic pile using individual cells as building blocks—parallel construction, series construction, and hybrid series-parallel construction. A pure parallel construction is unworkable with some cells depending on the chemistry of the cells. The parallel construction maximizes current supply capacity at the expense of voltage, the series construction maximizes voltage at the expense of current capacity, and the hybrid construction falls between these extremes. Many designers of battery-motor systems will avoid the parallel approach since there are power losses in the connecting cables and motor wiring that are at least linear with the current levels. Heavier-gauge wiring is needed to carry the current and this adds to the mass of the system. But there are also drawbacks to series-type arrangements, since as mentioned above the series pile has performance that is degraded to that of the weakest cell in the pile. Series-parallel arrangements can have any and all of the drawbacks of the series arrangements and of the parallel arrangements.

Figure 1:
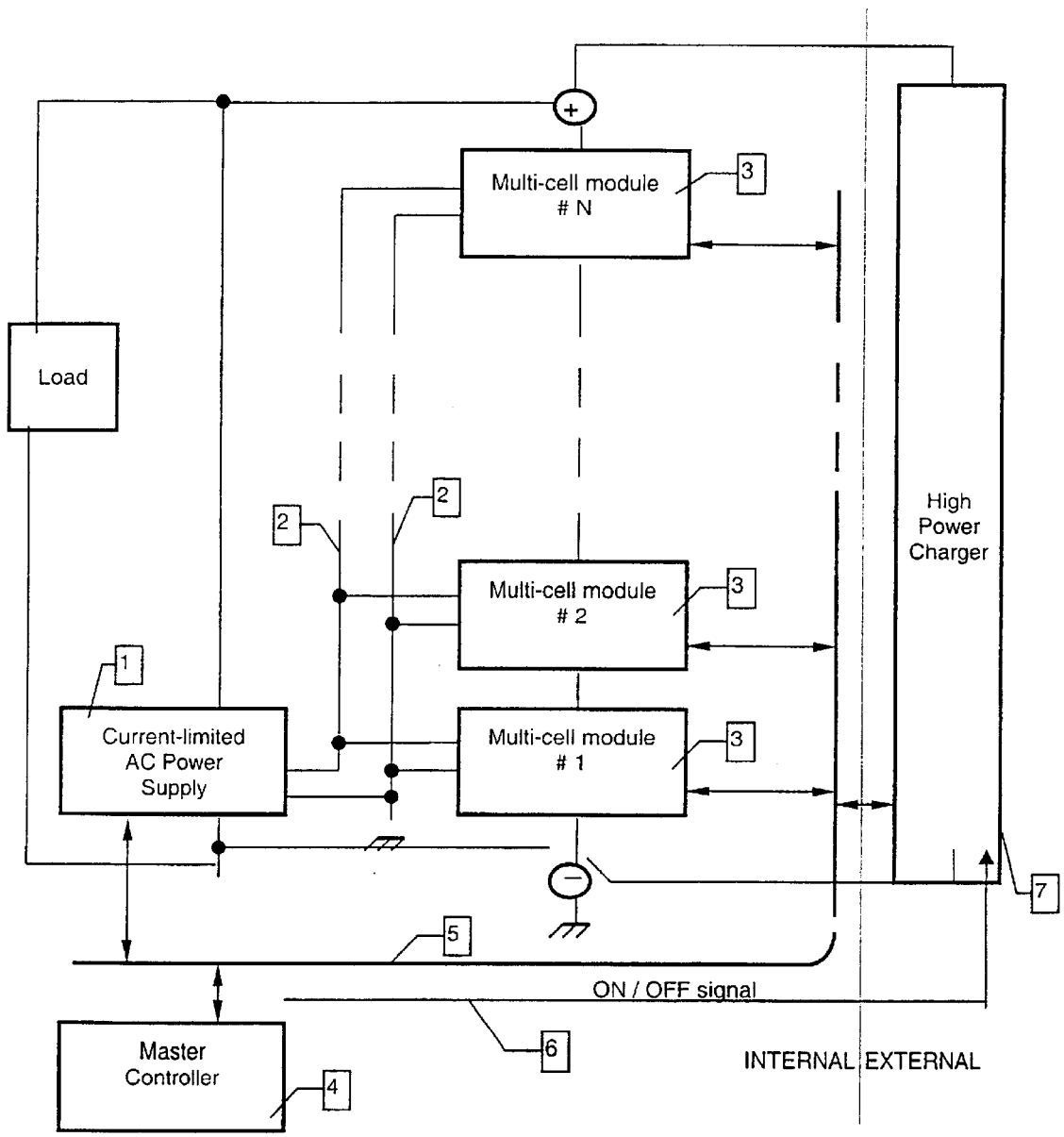
FIG. 1 shows a voltaic pile in accordance with an embodiment of the invention, with modules shown as functional blocks.

The charge redistribution system as shown in FIG. 1 is depicted with respect to an exemplary embodiment in which the cells are series-connected, defining a voltaic pile. (Those skilled in the art will appreciate that the teachings of the invention can equally well give their benefits to a parallel-connected array of cells, and to a series-parallel array of cells.) Individual cells are grouped into multi-cell modules 3 (using series connections), and modules 3 are in turn series-connected in order to create a complete battery (voltaic pile).

Figure 2:
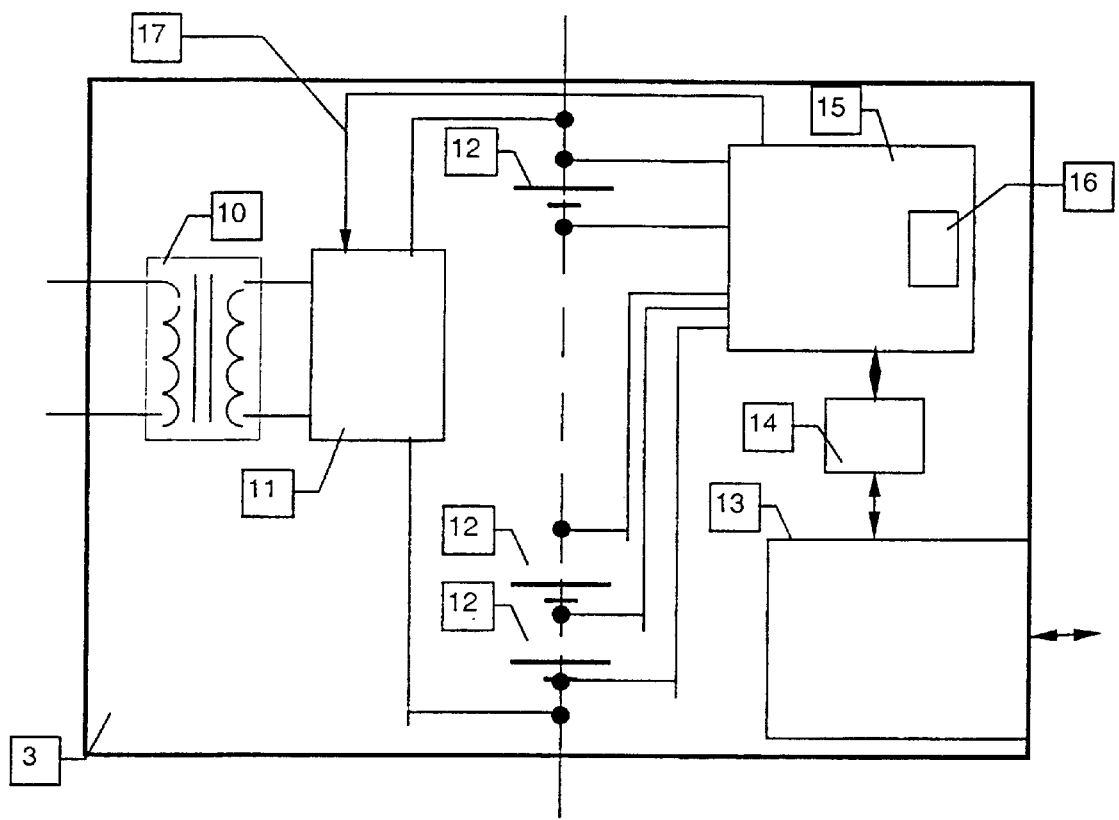
FIG. 2 shows in functional block diagram form a module such as that portrayed in FIG. 1.

The modules 3 of FIG. 1 are shown in more detail in FIG. 2. High voltage DC from the entire voltaic pile having terminals "+" and "−" is provided to power supply 1 by means of power lines connected to those terminals. The power supply 1 is preferably a switched-mode current-limited power supply. The power supply output is provided on lines 2.

Each of the modules 3 can accept AC power from lines 2 via a galvanic isolation transformer 10, as directed by a master controller 4. Inside each of the individual modules 3, a high-efficiency synchronous rectifier (typically a bridge rectifier) and disconnect switch 11. The rectifier of course converts AC power into DC charging current for the module 3. It is desirable to provide a master controller 4 which directs the actions of the power supply 1 and of each module. A high power charger 7 is provided which provides the main charging of the pile.

The module contains individual cells 12. A communications bus interface 13 interfaces with the communications channel 5, and is preferably optically isolated from the power-handling circuitry 15 by means of optoisolators 14. Power handling (metering and balancing) circuitry 15 desirably has a nonvolatile memory 16 which is used to store information about the number of charge/discharge cycles which have occurred in the life of the module 3 and other historical data for the module 3 as well as a unique identifier. A control signal 17 is provided which permits the circuit 15 to disconnect the disconnect switch 11 whenever it is desired to discontinue charging for that module.

In an exemplary embodiment, there may be ten modules of 30 V each in series. In such an embodiment the voltaic pile operates at 300 V and a typical power level would be 300 W. The charge redistribution system would convert current of 1 A at 300 V into an AC waveform for supply to lines 2. Any one module might be drawing upon a current of up to 10 A at 30 V, giving rise to a charging current of perhaps 9 A.

Desirably, each of the modules 3 is equipped with a controller comprising circuitry 15 and nonvolatile memory 16 having an ability to predict the remaining available electrical capacity and its state of charge by measuring the module's current, the voltages of the cell or cells making up the module, the temperature of the cell or cells, and by taking into account history.information about the voltaic pile (e.g. number of charge/discharge cycles), and the controller preferably communicates with the master controller 4.

Master controller 4 makes the decision when and if the power supply 1 is to be activated, and determines which module 3 should actually accept the charging current. The master controller 4 receives information from the modules 3 and sends commands to the power supply 1 and to the modules 3 via a communications bus 5. It may also send commands to a high power charger 7 via communications bus 5.

The high power charger 7 can be built-in or external to the system, the latter being the usual case for an electric vehicle. The high power charger 7 may or may not receive commands and/or information from the master controller via communications bus 5.

In embodiments in which there is communication between the master controller 4 and the high power charger 7, then the master controller 4 can program the high power charger 7 to provide the optimum charging current for the immediate condition of the whole voltaic pile (battery), and can terminate charging when necessary.

In other embodiments the high power charger acts independently from the master controller 4, using its own algorithms for current setting and charge termination. In such a case the charge redistribution system of the invention nonetheless helps in real time in balancing charge among modules during charging as well as during discharge (drain) conditions.

At first reading one might think that it is intended that the charge redistribution system described herein could be used as a main charger for the voltaic pile and that the high power charger 7 is not strictly necessary. But those skilled in the art will readily appreciate that the charging accomplished with the high power charger 7 is at a high voltage, and thus the heat losses in transmission lines (proportional to $I^2R$) need not be large. This is much preferable to what would happen if the charge redistribution system were used for the main charging, because it would take place in a system of low-voltage chargers, each of which has non-negligible $I^2R$ losses because it uses higher current and lower voltage. Thus those skilled in the art can appreciate the design benefits to making the charge redistribution system operate at at least an order of magnitude, and perhaps two or three orders of magnitude, below the peak charge or discharge power levels. The decision to size the charge redistribution system in this way permits cutting back on the wire thicknesses, on transformer sizes, and on the current ratings of semiconductors and switches.

Returning to FIG. 1, in addition to the optional connection via communications bus 5, in some embodiments there can be a simple on/off control signal 6 between the master controller 4 and the high power charger 7. This permits a safety or secondary protection signal to stop charging entirely in the event that one of the modules 3 reports an existing or imminent condition of overcharge or overheating. (Such a charging cutoff is particular important with lithium ion cells.) Similarly, if the master controller 4 detects a communications breakdown or fails to receive a periodic message from any of the system's components it is desirable to shut down high power charging completely.

As used in electric vehicles, the system provides high current in short bursts during acceleration and accepts current during regenerative braking. Total power capacity of the battery (pile) is one or two orders of magnitude higher than the maximum power transfer accomplished by the charge redistribution system of the invention. Stated differently, the charge redistribution system would typically operate at power levels that are 1/10th or 1/100th of the power capability of the pile (battery), in terms of continuous or average power. The charge redistribution system would be built into the battery housing, will operate with high efficiency (typically 90%) due to the high frequency of the alternating current, and will produce negligible amounts of heat as compared with the heat generated in the battery itself. When the power level of the charge redistribution system is compared with that of the peak drain or charge values, the ratio is likely to be three or four orders of magnitude (1 to 100 or 1 to 1000).

Preferably the system described herein is employed on a continual basis, helping to protect a weak cell through intervals of acceleration, regenerative braking, and sustaining speed while driving.

The optimal strategies for the charge redistribution system depend on the present state of the battery, and on current driving or load conditions etc., and can be optimized by the master controller 4. For example if energy use in the current discharge cycle will not fully deplete even the smallest-capacity cell (as in the case of an electric vehicle driven for a short distance between recharges) then no charge redistribution will be required. In this case the system will perform charge redistribution only as needed to compensate for the different self-discharge rates of individual cells.

Those skilled in the art will quite readily devise obvious improvements and variants of the invention, all of which are intended to be covered by the claims which follow.

I claim:

1. A voltaic pile with first and second terminals, said pile comprising:

a plurality of modules, each having third and fourth respective terminals with a plurality of voltaic cells connected series-wise therebetween;

said modules connected series-wise by said respective third and fourth terminals, with end terminals of said series-wise-connected modules defining said first and second terminals;

said voltaic pile sized to operate at a first power level;

a charge redistribution system with DC input terminals and AC output terminals, said DC input terminals connected with said first and second terminals, said charge redistribution system operating at a power level no greater than one-tenth of the first power level;

each of said modules having respective charging terminals connected with said charge redistribution system AC output terminals;

each of said modules further having a transformer with a primary winding connected with said charging terminals and a secondary winding coupled via a rectifier with the cells of said each of said modules whereby said cells are charged.

2. The voltaic pile of claim 1 in which each of said modules further comprises a module charging controller operatively connected with said cells of said each of said modules for balancing the charging thereof, said pile further comprising a master charging controller communicatively coupled with each of said module charging controllers and with said charge redistribution system.

3. The voltaic pile of claim 1 in which said charge redistribution system is current-limited.

4. The voltaic pile of claim 1 wherein the charge redistribution system operates at a power level no greater than one-hundredth of the first power level.

5. The voltaic pile of claim 1 further comprising a charger capable of operating at a power level at least ten times higher than the charge redistribution system.

6. A voltaic pile with first and second terminals, said pile comprising:
   a plurality of modules, each having third and fourth respective terminals with at least one voltaic cell connected series-wise therebetween;
   said modules connected series-wise by said respective third and fourth terminals, with end terminals of said series-wise-connected modules defining said first and second terminals;
   said pile operating at a first power level;
   a charge redistribution system with DC input terminals and AC output terminals, said DC input terminals connected with said first and second terminals and operating at a power level no greater than one-tenth of the first power level;
   each of said modules having respective charging terminals connected with said charge redistribution system AC output terminals;
   each of said modules further having a transformer with a primary winding connected with said charging terminals and a secondary winding coupled via a rectifier with the at least one cell of said each of said modules whereby said at least one cell is charged.

7. The voltaic pile of claim 6, said pile further comprising a master charging controller communicatively coupled with each of said modules and with said charge redistribution system.

8. The voltaic pile of claim 6 in which said charge redistribution system is current-limited.

9. The voltaic pile of claim 6 further comprising a charger operating at a power level at least ten times that of the charge redistribution system.

10. A voltaic pile with first and second terminals, said pile comprising:
    a plurality of modules, each having third and fourth respective terminals with a plurality of voltaic cells connected series-wise therebetween;
    said modules connected in a series-parallel array by said respective third and fourth terminals, with end terminals of said series-parallel connected modules defining said first and second terminals;
    said pile sized to operate at a first power level;
    a charge redistribution system with DC input terminals and AC output terminals, said DC input terminals connected with said first and second terminals, said charge redistribution system sized to operate at a level no greater than one-tenth of the first power level;
    each of said modules having respective charging terminals connected with said charge redistribution system AC output terminals;
    each of said modules further having a transformer with a primary winding connected with said charging terminals and a secondary winding coupled via a rectifier with the cells of said each of said modules whereby said cells are charged.

11. The voltaic pile of claim 10 in which each of said modules further comprises a module charging controller operatively connected with said cells of said each of said modules for balancing the charging thereof, said pile further comprising a master charging controller communicatively coupled with each of said module charging controllers and with said charge redistribution system.

12. The voltaic pile of claim 10 in which said charge redistribution system is current-limited.

13. The voltaic pile of claim 10 further comprising a charger sized to operate at a level at least ten times that of the charge redistribution system.

14. A voltaic pile with first and second terminals, said pile comprising:
    a plurality of modules, each having third and fourth respective terminals with at least one voltaic cell connected series-wise therebetween;
    said modules connected series-wise by said respective third and fourth terminals, with end terminals of said series-wise-connected modules defining said first and second terminals, said pile operating at a first power level;
    a charge redistribution system with DC input terminals and AC output terminals, said DC input terminals connected with said first and second terminals and operating at a power level no greater than one-tenth of the first power level;
    each of said modules having respective charging terminals connected with said charge redistribution system AC output terminals;
    each of said modules further having a transformer with a primary winding connected with said charging terminals and a secondary winding coupled via a rectifier with the at least one cell of said each of said modules whereby said at least one cell is charged.

15. The voltaic pile of claim 14, said pile further comprising a master charging controller communicatively coupled with each of said modules and with said charge redistribution system.

16. The voltaic pile of claim 14 in which said charge redistribution system is current-limited.

17. The voltaic pile of claim 14 further comprising a charger operating at a power level more than ten times that of the charge redistribution system.

18. A method for redistributing charge in a voltaic pile comprising at least a series configuration of modules, each containing at least one voltaic cell, said pile further comprising a DC-to-AC charge redistribution system, the AC output of the charge redistribution system inductively coupled with chargers electrically coupled with respective modules, said method comprising the steps of:
    operating the charge redistribution system at a power level no greater than one-tenth the operating power of the pile; and
    applying charging current selectively to the modules so as to balance the state of charge of the voltaic cells within the modules.

* * * * *